United States Patent
Zhou

(10) Patent No.: US 12,309,412 B2
(45) Date of Patent: *May 20, 2025

(54) CONVERTING A BI-PREDICTED MERGING CANDIDATE IN A MERGING CANDIDATE LIST

(71) Applicant: Texas Instruments Incorporated, Dallas, TX (US)

(72) Inventor: Minhua Zhou, San Diego, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,988

(22) Filed: Dec. 29, 2023

(65) Prior Publication Data

US 2024/0137551 A1 Apr. 25, 2024

Related U.S. Application Data

(63) Continuation of application No. 17/213,569, filed on Mar. 26, 2021, now Pat. No. 11,863,782, which is a
(Continued)

(51) Int. Cl.
 *H04N 19/51* (2014.01)
 *H04N 19/105* (2014.01)
 (Continued)

(52) U.S. Cl.
 CPC ........... *H04N 19/51* (2014.11); *H04N 19/105* (2014.11); *H04N 19/109* (2014.11);
 (Continued)

(58) Field of Classification Search
 None
 See application file for complete search history.

(56) References Cited

U.S. PATENT DOCUMENTS 6,414,999 B1 7/2002 Igi et al.
9,503,743 B2 11/2016 Guo et al.
(Continued)

FOREIGN PATENT DOCUMENTS

WO 2009050658 A2 4/2009
WO WO-2013070355 A1 * 5/2013 .............. H03M 7/30

OTHER PUBLICATIONS

Gary J. Sullivan et al, "Overview of the High Efficiency Video Coding (HEVC) Standard", IEEE Transactions on Circuits and Systems for Video Technology, vol. 22, No. 12, Dec. 2012, pp. 1649-1668.
(Continued)

*Primary Examiner* — Tyler W. Sullivan
(74) *Attorney, Agent, or Firm* — Carl G. Peterson; Frank D. Cimino

(57) ABSTRACT

Motion compensation requires a significant amount of memory bandwidth, especially for smaller prediction unit sizes. The worst case bandwidth requirements can occur when bi-predicted 4×8 or 8×4 PUs are used. To reduce the memory bandwidth requirements for such smaller PUs, methods are provided for restricting inter-coded PUs of small block sizes to be coded only in a uni-predictive mode, i.e., forward prediction or backward prediction. More specifically, PUs of specified restricted sizes in bi-predicted slices (B slices) are forced to be uni-predicted.

20 Claims, 6 Drawing Sheets

Related U.S. Application Data continuation of application No. 16/898,820, filed on Jun. 11, 2020, now Pat. No. 10,992,948, which is a continuation of application No. 16/437,098, filed on Jun. 11, 2019, now Pat. No. 10,721,487, which is a continuation of application No. 15/451,085, filed on Mar. 6, 2017, now Pat. No. 10,362,326, which is a continuation of application No. 13/864,159, filed on Apr. 16, 2013, now Pat. No. 9,591,312.

(60) Provisional application No. 61/651,652, filed on May 25, 2012, provisional application No. 61/625,811, filed on Apr. 18, 2012, provisional application No. 61/625,256, filed on Apr. 17, 2012.

(51) Int. Cl.
| | |
|---|---|
| *H04N 19/109* | (2014.01) |
| *H04N 19/122* | (2014.01) |
| *H04N 19/157* | (2014.01) |
| *H04N 19/159* | (2014.01) |
| *H04N 19/176* | (2014.01) |
| *H04N 19/433* | (2014.01) |
| *H04N 19/52* | (2014.01) |
| *H04N 19/174* | (2014.01) |
| *H04N 19/184* | (2014.01) |

(52) U.S. Cl.
CPC ......... *H04N 19/122* (2014.11); *H04N 19/157* (2014.11); *H04N 19/159* (2014.11); *H04N 19/176* (2014.11); *H04N 19/433* (2014.11); *H04N 19/52* (2014.11); *H04N 19/174* (2014.11); *H04N 19/184* (2014.11)

(56) References Cited

U.S. PATENT DOCUMENTS

| | | | |
|---|---|---|---|
| 9,532,042 | B2 | 12/2016 | Kim et al. |
| 9,591,312 | B2 * | 3/2017 | Zhou ............... H04N 19/433 |
| 9,621,909 | B2 * | 4/2017 | Kim ............... H04N 19/91 |
| 10,362,326 | B2 * | 7/2019 | Zhou ............... H04N 19/51 |
| 10,721,487 | B2 * | 7/2020 | Zhou ............... H04N 19/52 |
| 10,992,948 | B2 * | 4/2021 | Zhou ............... H04N 19/159 |
| 11,265,541 | B2 | 3/2022 | Zhang et al. |
| 11,863,782 | B2 * | 1/2024 | Zhou ............... H04N 19/577 |
| 2005/0053298 | A1 | 3/2005 | Mukerjee et al. |
| 2011/0239721 | A1 | 10/2011 | Carter et al. |
| 2011/0249721 | A1 | 10/2011 | Karczewicz et al. |
| 2012/0189058 | A1 * | 7/2012 | Chen ............... H04N 19/174 |
| | | | 375/E7.243 |
| 2012/0207217 | A1 | 8/2012 | Francois |
| 2012/0236941 | A1 | 9/2012 | Lin et al. |
| 2013/0156335 | A1 | 6/2013 | Lim et al. |
| 2013/0177083 | A1 | 7/2013 | Chen et al. |
| 2013/0188704 | A1 | 7/2013 | Zhou |
| 2013/0195188 | A1 | 8/2013 | Sugio et al. |
| 2013/0202037 | A1 | 8/2013 | Wang et al. |
| 2013/0202038 | A1 | 8/2013 | Seregin et al. |
| 2013/0272410 | A1 | 10/2013 | Seregin et al. |
| 2015/0103911 | A1 | 4/2015 | Lee |
| 2015/0163511 | A1 | 6/2015 | Kim et al. |
| 2015/0312588 | A1 | 10/2015 | Yamamoto et al. |
| 2016/0165209 | A1 | 6/2016 | Huang et al. |
| 2021/0385461 | A1 | 12/2021 | Liu et al. |

OTHER PUBLICATIONS

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, Mar. 16-23, 2011, Geneva, Switzerland (221 pages).

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, Jul. 14-22, 2011, Torino, Italy (229 pages).

Tomohiro Ikai, "Bi-Prediction Restriction in Small PU", JCTVC-G307_r1, Joint Collaborative Team on Video Coding (JCT-VC) of ITU-T SG16 WP3 and ISO/IEC JTC1/SC29/WG11, Nov. 21-30, 2011, Geneva, Switzerland (5 pages).

Tomohiro Ikai, "Bi-Prediction Restriction in Small PU", JCTVC-G307 Presentation, Joint Collaborative Team on Video Coding (JCT-VC) of ITU-T SG16 WP3 and ISO/IEC JTC1/SC29/WG11, Nov. 21-30, 2011, Geneva, Switzerland (9 pages).

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, Nov. 21-30, 2011, Geneva, Switzerland (237 pages).

Tomohiro Ikai, "AHG7: Controllable Memory Bandwidth Reduction with Bi-Pred to Uni-Pred Conversion", JCTVC-H0096, Joint Collaborative Team on Video Coding (JCT-VC) of ITU-T SG16 WP3 and ISO/IEC JTC1/SC29/WG11, Feb. 1-10, 2012, San Jose, CA (8 pages).

Tomohiro Ikai, "AHG7: Controllable Memory Bandwidth Reduction with Bi-Pred to Uni-Pred Conversion", JCTVC-H0096 Presentation, Joint Collaborative Team on Video Coding (JCT-VC) of ITU-T SG16 WP3 and ISO/IEC JTC1/SC29/WG11, Feb. 1-10, 2012, San Jose, CA (12 pages).

Kenji Kondo et al, "AHG7: Modification of Merge Candidate Derivation to Reduce MC Memory Bandwidth", JCTVC-H0221, Joint Collaborative Team on Video Coding (JCT-VC) of ITU-T SG16 WP3 and ISO/IEC JTC1/SC29/WG11, Feb. 1-10, 2012, San Jose, CA (8 pages).

Ken McCann et al, "HM6: High Efficiency Video Coding (HEVC) Test Model 6 Encoder Description", JCTVC-H1002, Joint Collaborative Team on Video Coding (JCT-VC) of ITU-T SG16 WP3 and ISO/IEC JTC1/SC29/WG11, Feb. 1-10, 2012, San Jose, CA (42 pages).

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, Nov. 21-30, 2022, Geneva, Switzerland (259 pages).

Kenji Kondo and Teruhiko Suzuki, "AHG7: Level Definition to Limit Memory Bandwidth of MC", JCTVC-I0106, Joint Collaborative Team on Video Coding (JCT-VC) of ITU-T SG16 WP3 and ISO/IEC JTC1/SC29/WG11, Apr. 27-May 7, 2012, Geneva, Switzerland (6 pages).

Kenji Kondo et al, "AHG7: Modification of Merge Candidate Derivation to Reduce MC Memory Bandwidth", JCTVC-I0107_r1, Joint Collaborative Team on Video Coding (JCT-VC) of ITU-T SG16 WP3 and ISO/IEC JTC1/SC29/WG11, Apr. 27-May 7, 2012, Geneva, Switzerland (9 pages).

Tim Hellman and Wade Wan, "AHG7: Reducing HEVC Worst-Case Memory Bandwidth by Restricting Bi-Directional 4x8 and 8x4 Prediction Units", JCTVC-I0216v2, Joint Collaborative Team on Video Coding (JCT-VC) of ITU-T SG16 WP3 and ISO/IEC JTC1/SC29/WG11, Apr. 27-May 7, 2012, Geneva, Switzerland (9 pages).

Minhua Zhou, "AHG7: A Combined Study on JCTVC-I0216 and JCTVC-I0107", JCTVC-I0425, Joint Collaborative Team on Video Coding (JCT-VC) of ITU-T SG16 WP3 and ISO/IEC JTC1/SC29/WG11, Apr. 27-May 7, 2012, Geneva, Switzerland (7 pages).

Minhua Zhou, "AHG7: A Combined Study on JCTVC-I0216 and JCTVC-I0107", JCTVC-I0425 Presentation, Joint Collaborative Team on Video Coding (JCT-VC) of ITU-T SG16 WP3 and ISO/IEC JTC1/SC29/WG11, Apr. 27-May 7, 2012, Geneva, Switzerland (2 pages).

Toshiyasu Sugio, "AHG7: Cross-Check Report of a Combined Study on JCTVC-I0216 and JCTVC-I0107 (JCTVC-10425)", JCTVC-I0438, Joint Collaborative Team on Video Coding (JCT-VC) of ITU-T SG16 WP3 and ISO/IEC JTC1/ SC29/WG11, Apr. 27-May 7, 2012, Geneva, Switzerland (3 pages).

Il-Koo Kim et al, "HM7: High Efficiency Video Coding (HEVC) Test Model 7 Encoder Description", JCTVC-I1002, Joint Collab-

(56) References Cited

OTHER PUBLICATIONS orative Team on Video Coding (JCT-VC) of ITU-T SG16 WP3 and ISO/IEC JTC1/SC29/WG11, Apr. 27-May 7, 2012, Geneva, Switzerland (50 pages).

Benjamin Bross et al, "High Efficiency Video Coding (HEVC) Text Specification Draft 7", JCTVC-I1003_d0, Joint Collaborative Team on Video Coding (JCT-VC) of ITU-T SG16 WP3 and ISO/IEC JTC1/SC29/WG11, Apr. 27-May 7, 2012, Geneva, Switzerland (270 pages).

Minhua Zhou, "AHG7: Disallow Bi-Predictive Mode for 8×4 and 4×8 Inter PUs", JCTVC-J0086, Joint Collaborative Team on Video Coding (JCT-VC) of ITU-T SG16 WP3 and ISO/IEC JTC1/SC29/WG11, Jul. 11-20, 2012, Stockholm, Sweden (4 pages).

Il-Koo Kim et al, "HM7: High Efficiency Video Coding (HEVC) Test Model 8 Encoder Description", JCTVC-J1002, Joint Collaborative Team on Video Coding (JCT-VC) of ITU-T SG16 WP3 and ISO/IEC JTC1/SC29/WG11, Jul. 11-20, 2012, Stockholm, Sweden (43 pages).

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, Jul. 11-20, 2012, Stockholm, Sweden (261 pages).

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, Oct. 10-19, 2012, Shanghai, China (317 pages).

Il-Koo Kim et al, "High Efficiency Video Coding (HEVC) Test Model 10 (HM10) Encoder Description", JCTVC-L1002_v3, Joint Collaborative Team on Video Coding (JCT-VC) of ITU-T SG16 WP3 and ISO/IEC JTC1/SC29/WG11, Jan. 14-23, 2013, Geneva, Switzerland (40 pages).

"TMS320DM6467 Digital Media System-on-Chip", SPRS403G, Texas Instruments Incorporated, Dec. 2007, revised Oct. 2010 (355 pages).

Shigeru Fukushima et al., "AHG7: Bi-Pred Restriction for Small PUs", JCTVC-I0297, Joint Collaborative Team on Video Coding (JCT-VC) of ITU-T SG16 WP3 and ISO/IEC JTC1/SC29/WG11, Apr. 27-May 7, 2012, Geneva, Switzerland (10 pages).

* cited by examiner though or motion compensation as compared to the 6-tap filter of H.264/AVC, thus the memory bandwidth requirements for motion compensation in HEVC are much higher than H.264/AVC for the same prediction block size. For the worst case prediction block size of 4×4, the memory bandwidth for motion compensation in HEVC (i.e., $(7+4)*(7+4)*2/(5+4)/(5+4)/2)$) is increased by about 50% over H.264/AVC. HEVC does allow inter-prediction of the smallest prediction block size (4×4) to be disabled, which helps reduce memory bandwidth requirements. If inter-prediction of 4×4 prediction blocks is disabled, motion compensation of 4×8 or 8×4 bi-directionally predicted prediction blocks becomes the worst case. In this instance, the relative memory bandwidth increase of HEVC as compared to H.264/AVC is approximately 2%, (i.e., $(7+4)*(7+8)*2/(5+4)/(5+4)/2/2)$.

CONVERTING A BI-PREDICTED MERGING CANDIDATE IN A MERGING CANDIDATE LIST

CROSS-REFERENCE TO RELATED APPLICATIONS

This application is a continuation of U.S. patent application Ser. No. 17/213,569, filed Mar. 26, 2021, currently and scheduled to grant as U.S. Pat. No. 11,863,782 on Jan. 2, 2024, which is a continuation of U.S. patent application Ser. No. 16/898,820, filed Jun. 11, 2020 (now U.S. Pat. No. 10,992,948), which is a continuation of U.S. patent application Ser. No. 16/437,098, filed Jun. 11, 2019 (now U.S. Pat. No. 10,721,487), which is a continuation of U.S. patent application Ser. No. 15/451,085, filed Mar. 6, 2017 (now U.S. Pat. No. 10,362,326), which is a continuation of U.S. patent application Ser. No. 13/864,159, filed Apr. 16, 2013 (U.S. Pat. No. 9,591,312), which application claims benefit of U.S. Provisional Patent Application No. 61/625,256, filed Apr. 17, 2012, U.S. Provisional Patent Application No. 61/625,811, filed Apr. 18, 2012, and U.S. Provisional Patent Application No. 61/651,652, filed May 25, 2012, all of which are incorporated herein by reference in their entirety.

BACKGROUND OF THE INVENTION

Field of the Invention

Embodiments of the present invention generally relate to memory bandwidth reduction for motion compensation in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. To address these requirements, HEVC utilizes larger block sizes then H.264/AVC. In HEVC, the largest coding unit (LCU) can be up to 64×64 in size, while in H.264/AVC, the macroblock size is fixed at 16×16. Further, HEVC allows more variation in the sizes of prediction blocks, e.g., 4×4, 8×4, 4×8, etc.

Motion compensation in H.264/AVC is to known to require a large amount of memory bandwidth in embedded decoder implementations, such as smart phones, set-top boxes, etc. Allocation of 1 Gbyte/second (GB/second) or more of memory bandwidth to an H.264/AVC high definition (HD) decoder to guarantee proper decoding of worst-case video bit streams is not uncommon. Memory bandwidth for motion compensation is determined by factors such as prediction block size, the extent of the filter used in motion compensation, and the access characteristics of the memory. HEVC specifies an 8-tap filter for interpolation in Further, HEVC is designed to support Ultra High Definition (UHD) video, which further increases the memory bandwidth requirements for motion compensation. The memory bandwidth for motion compensation of HUD video is expected to be an increasing bottleneck. Thus, further reduction of the worst cast memory bandwidth requirements for motion compensation is desirable.

SUMMARY

Embodiments of the present invention relate to methods, apparatus, and computer readable media for reducing memory bandwidth need for motion compensation. In one aspect, a method for processing a prediction unit (PU) of a picture is provided that includes determining that the PU is in a bi-predicted slice of the picture, and restricting prediction of the PU to uni-prediction when a size of the PU is a predetermined size.

In one aspect, an apparatus configured for processing a prediction unit (PU) of a picture is provided that includes means for determining that the PU is in a bi-predicted slice of the picture, and means for restricting prediction of the PU to uni-prediction when a size of the PU is a predetermined size.

In one aspect, a non-transitory computer readable medium storing software instructions is provided. The software instructions, when executed by a processor, cause a method for processing a prediction unit (PU) of a picture to be performed. The method includes determining that the PU is in a bi-predicted slice of the picture, and restricting prediction of the PU to uni-prediction when a size of the PU is a predetermined size.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
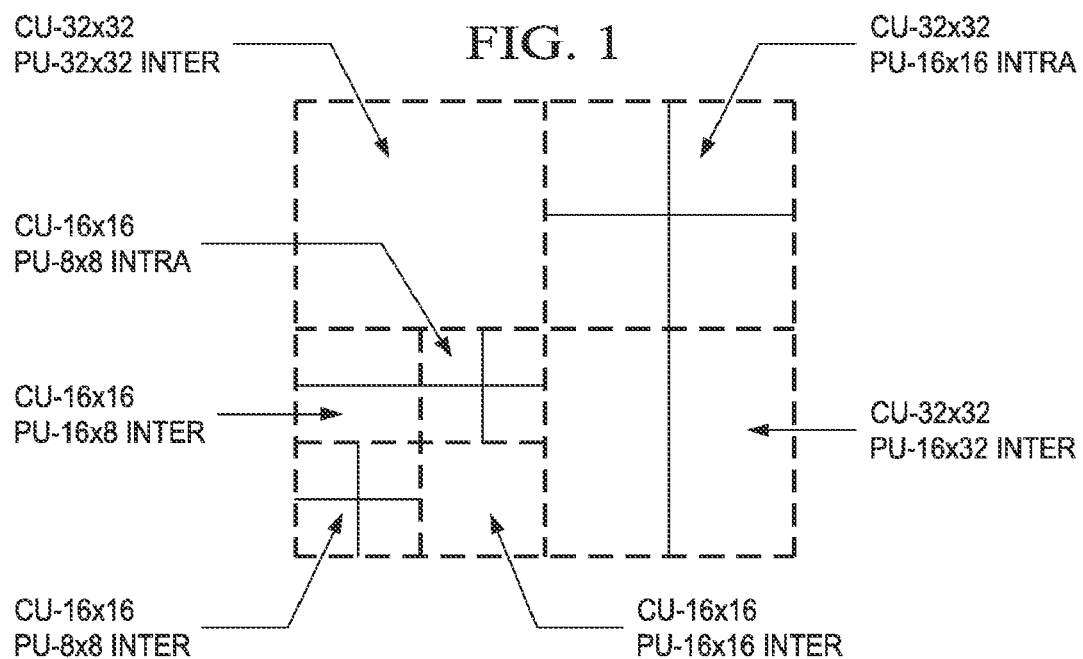
FIG. 1 is an example illustrating quadtree partitioning of a 64×64 largest coding unit (LCU)

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CUs) and CUs may be partitioned into prediction units (PUs). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the largest CU (LCU) and the smallest CU (SCU) specified for a picture. In recent versions of HEVC, the largest CU size and minimum CU size permitted are 64×64 and 8×8, respectively.

The coding node is the root node of two trees, a prediction tree and a transform tree. A prediction tree specifies the position and size of prediction units (PU) for a CU. A transform tree specifies the position and size of transform units (TU) for a CU. A PU may not be larger than a CU, and the size may be, for example, 8×4, 4×8, 8×8, 16×8, 8×18, 16×16, etc. A transform unit may not be larger than a CU and the size of a transform unit may be, for example, 4×4, 8×8, 16×16, and 32×32. The sizes of the TUs and PUs for a CU are determined by the video encoder during prediction based on minimization of rate/distortion costs. FIG. 1 shows an example of a quadtree based LCU to CU/PU decomposition structure in which the size of the SCU is 16×16 and the size of the LCU is 64×64.

As used herein, a co-located PU or temporally co-located PU is a rectangular or square area in a reference picture having the same coordinates, size, and shape of a PU in a picture currently being encoded or decoded, i.e., a PU for which a merging candidate list or an advanced motion vector predictor (AMVP) candidate list is being constructed. As is well-known, PU partitioning may change from LCU to LCU, and from picture to picture. Thus, a co-located PU does not necessarily correspond to an actual PU of the reference picture. Rather, depending on the size, the co-located PU may overlap one actual PU, multiple actual PUs, portions of several actual PUs, a portion of an actual PU, etc. in the reference picture.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-11003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), and B. Bross, et al., "High Efficiency Video Coding (HEVC) Text Specification Draft 9," JCTVC-K1003_v7, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9").

Some aspects of this disclosure have been presented to the JCT-VC in M. Zhou, "AHG7: A Combined Study on JCTVC-I0216 and JCTVC-I0107," JCTVC-I0425, Joint Collaborative Team on Video Coding (JCT-VC) of ITU-T SG16 WP3 and ISO/IEC JTC1/SC29/WG1, Geneva, Switzerland, Apr. 27, 2012-May 7, 2012, and M. Zhou, "AHG7: Disallow Bi-Predictive Mode for 8×4 and 4×8 Inter PUs," JCTVC-J0086, Joint Collaborative Team on Video Coding (JCT-VC) of ITU-T SG16 WP3 and ISO/IEC JTC1/SC29/WG1, Stockholm, Sweden, Jul. 11-20, 2012, both of which are incorporated by reference herein in their entirety.

As previously discussed, motion compensation requires a significant amount of memory bandwidth, especially for smaller prediction unit sizes. In HEVC, inter-prediction of 4×4 PUs is permanently disabled. Thus, the worst case bandwidth requirements can occur when bi-predicted 4×8 or 8×4 PUs are used. To reduce the memory bandwidth requirements for such smaller PUs, embodiments of the invention provide for restricting inter-coded PUs of small block sizes to be coded only in a uni-predictive mode, i.e., forward prediction or backward prediction. More specifically, PUs of specified restricted sizes in bi-predicted slices (B slices) are forced to be uni-predicted.

Figure 2:
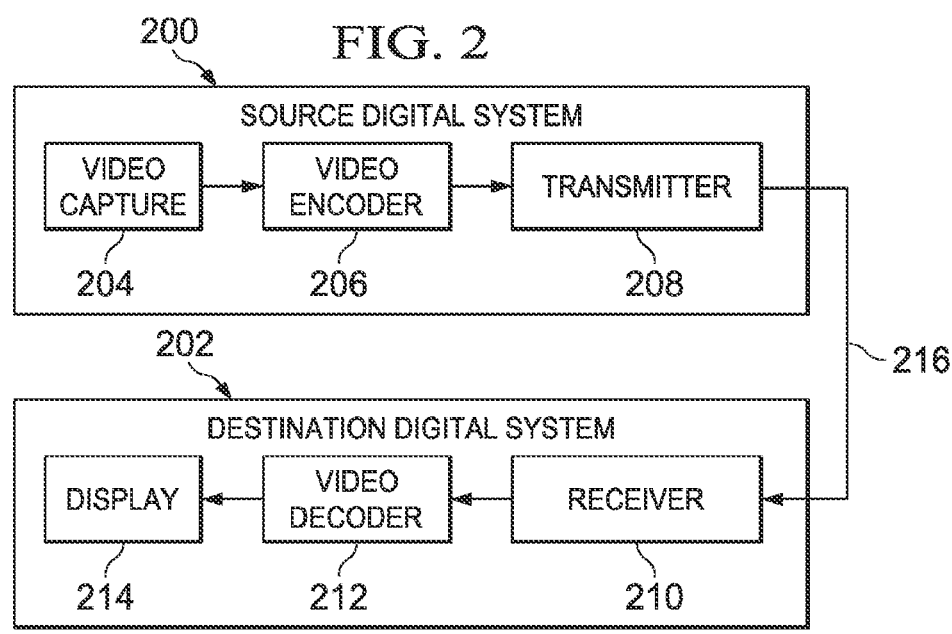
FIG. 2 is a block diagram of a digital system.

FIG. 2 shows a block diagram of a digital system that includes a source digital system 200 that transmits encoded video sequences to a destination digital system 202 via a communication channel 216. The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into largest coding units (LCUs), and encodes the video data in the LCUs. The video encoder component 206 may be configured to reduce memory compensation bandwidth by forcing PUs of specified restricted sizes in B slices to be uni-predicted during the encoding process as described herein. An embodiment of the video encoder component 206 is described in more detail herein in reference to FIG. 3.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the LCUs of the video sequence. The video decoder component 212 may be configured to decode PUs of specified restricted sizes in B slices during the decoding process as described herein, thus reducing the motion compensation bandwidth consumed over the prior art. An embodiment of the video decoder component 212 is described in more detail below in reference to FIG. 4.

The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video streaming, video broadcasting, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3:
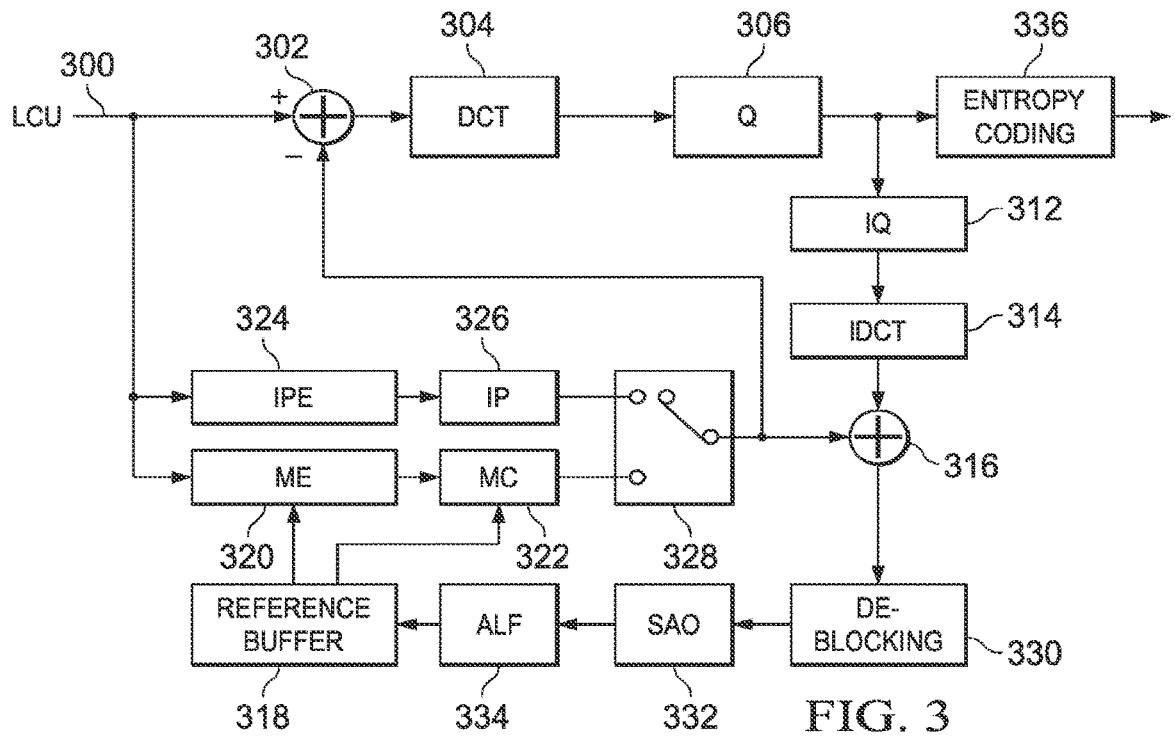
FIG. 3 is a block diagram of a video encoder.

FIG. 3 is a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 300 of the input video sequence from the coding control component and encodes the LCUs 300 under the control of the coding control component to generate the compressed video stream. The LCUs 300 in each picture are processed in row order. The LCUs 300 from the coding control component are provided as one input of a motion estimation component (ME) 320, as one input of an intra-prediction estimation component (IPE) 324, and to a positive input of a combiner 302 (e.g., adder or subtractor or the like). Further, although not specifically shown, the prediction mode of each picture as selected by the coding control component is provided to a mode decision component 328 and the entropy coding component 336.

The storage component 318 provides reference data to the motion estimation component 320 and to the motion compensation component 322. The reference data may include one or more previously encoded and decoded pictures, i.e., reference pictures.

The motion estimation component 320 provides motion data information to the motion compensation component 322 and the entropy coding component 336. In general, the motion estimation component 320 performs tests on CUs in an LCU based on multiple inter-prediction modes (e.g., skip mode, merge mode, and normal or direct inter-prediction), PU sizes, and TU sizes using reference picture data from storage 318 to choose the best CU partitioning, PU/TU partitioning, inter-prediction modes, motion vectors, etc. based on coding cost, e.g., a rate distortion coding cost. To perform the tests, the motion estimation component 320 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 322 may perform the method of FIG. 5 in which PUs of specified restricted sizes in B slices are forced to be uni-predicted to determine the best prediction mode for each PU. The motion estimation component 320 provides the motion vector (MV) or vectors and the prediction mode for each PU in the selected CU partitioning to the motion compensation component (MC) 322.

The motion compensation component 322 receives the selected inter-prediction mode and mode-related information from the motion estimation component 320 and generates the inter-predicted CUs. The inter-predicted CUs are provided to the mode decision component 328 along with the selected inter-prediction modes for the inter-predicted PUs and corresponding TU sizes for the selected CU/PU/TU partitioning. The coding costs of the inter-predicted CUs are also provided to the mode decision component 328.

The intra-prediction estimation component 324 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 324 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 324 provides the selected intra-prediction modes for the PUs, and the corresponding TU sizes for the selected CU partitioning to the intra-prediction component (IP) 326. The coding costs of the intra-predicted CUs are also provided to the intra-prediction component 326.

The intra-prediction component 326 (IP) receives intra-prediction information, e.g., the selected mode or modes for the PU(s), the PU size, etc., from the intra-prediction estimation component 324 and generates the intra-predicted CUs. The intra-predicted CUs are provided to the mode decision component 328 along with the selected intra-prediction modes for the intra-predicted PUs and corresponding TU sizes for the selected CU/PU/TU partitioning. The coding costs of the intra-predicted CUs are also provided to the mode decision component 328.

The mode decision component 328 selects between intra-prediction of a CU and inter-prediction of a CU based on the intra-prediction coding cost of the CU from the intra-prediction component 326, the inter-prediction coding cost of the CU from the motion compensation component 322, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 336.

The output of the mode decision component 328, i.e., the predicted PUs, is provided to a negative input of the combiner 302 and to the combiner 316. The associated transform unit size is also provided to the transform component 304. The combiner 302 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 304 performs block transforms on the residual CUs to convert the residual pixel values to transform coefficients and provides the transform coefficients to a quantize component 306. More specifically, the transform component 304 receives the transform unit sizes for the residual CU and applies transforms of the specified sizes to the CU to generate transform coefficients. Further, the quantize component 306 quantizes the transform coefficients based on quantization parameters (QPs) and quantization matrices provided by the coding control component and the transform sizes and provides the quantized transform coefficients to the entropy coding component 336 for coding in the bit stream.

The entropy coding component 336 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes (inter or intra) for the CUs, the prediction modes of PUs within CUs (normal inter prediction mode, merge mode, or intra-prediction mode), and the quantized transform coefficients for the CUs. For PUs predicted in merge mode, a syntax element for an index identifying a particular merging candidate in a merging candidate list may be encoded. For PUs predicted in normal prediction mode, a syntax element for an index identifying a particular motion vector predictor (MVP) candidate in an MVP candidate list may be encoded along with syntax elements for motion vector differences (MVDS), prediction direction, and a reference picture index (or indices). Merging candidate lists and MVP candidate lists are explained in reference to FIG. 5 herein. The entropy coding component 336 also codes relevant data from the in-loop filters (described below).

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 312, which outputs a reconstructed version of the transform result from the transform component 304. The dequantized transform coefficients are provided to the inverse transform component (IDCT) 314, which outputs estimated residual information representing a reconstructed version of a residual CU. The inverse transform component 314 receives the transform unit size used to generate the transform coefficients and applies inverse transform(s) of the specified size to the transform coefficients to reconstruct the residual values. The reconstructed residual CU is provided to the combiner 316.

The combiner 316 adds the original predicted CU to the residual CU to generate a reconstructed CU, which becomes part of reconstructed picture data. The reconstructed picture data is stored in a buffer (not shown) for use by the intra-prediction estimation component 324.

Various in-loop filters may be applied to the reconstructed picture data to improve the quality of the reference picture data used for encoding/decoding of subsequent pictures. The in-loop filters may include a deblocking filter component 330, a sample adaptive offset filter (SAO) component 332, and an adaptive loop filter (ALF) component 334. The in-loop filters 330, 332, 334 are applied to each reconstructed LCU in the picture and the final filtered reference picture data is provided to the storage component 318. In some embodiments, the ALF component 334 may not be present.

Figure 4:
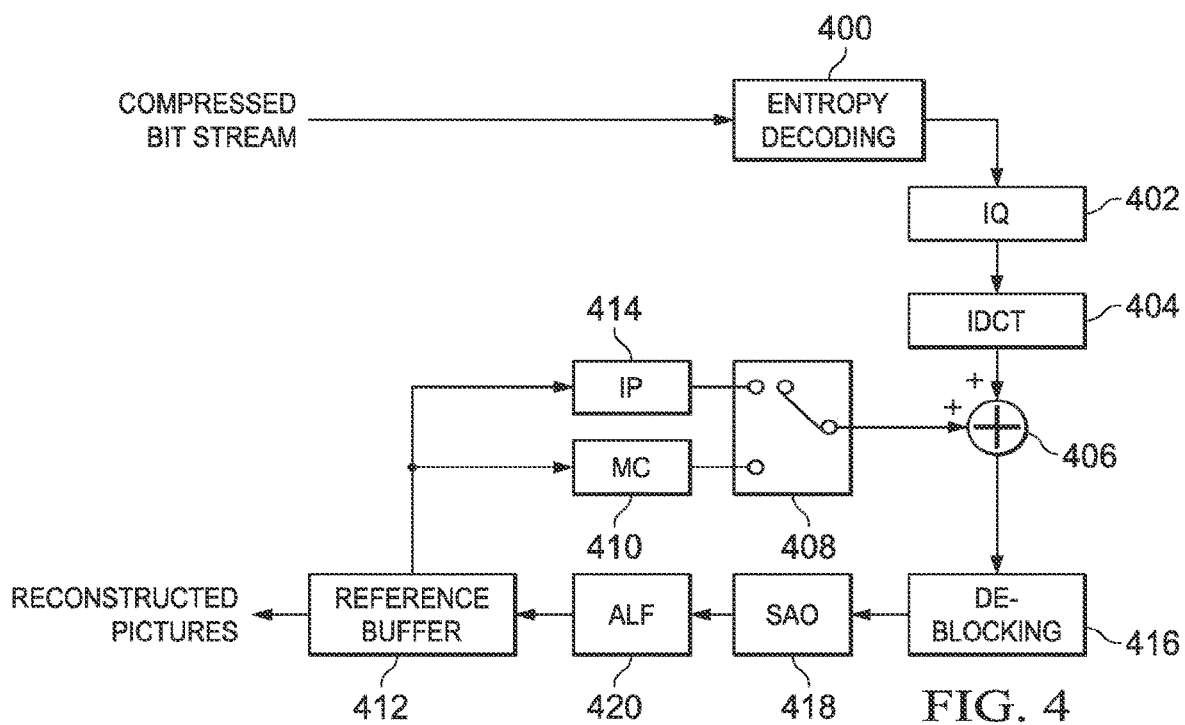
FIG. 4 is a block diagram of a video decoder.

FIG. 4 is a block diagram of an example video decoder. The video decoder operates to reverse the encoding operations, i.e., entropy coding, quantization, transformation, and prediction, performed by the video encoder of FIG. 3 to regenerate the pictures of the original video sequence. In view of the above description of a video encoder, one of ordinary skill in the art will understand the functionality of components of the video decoder without detailed explanation.

The entropy decoding component 400 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, ALF coefficients, etc. The decoded syntax elements are passed to the various components of the decoder as needed. For example, decoded prediction modes are provided to the intra-prediction component (IP) 414 or motion compensation component (MC) 410. If the decoded prediction mode is an inter-prediction mode, the entropy decoding component 400 determines the motion vector(s), reference picture indices, etc. as needed for PUs and provides the motion vector(s) to the motion compensation component 410. The entropy decoding component may perform the method of FIG. 6 to determine motion vectors, etc., for an inter-predicted PU.

The inverse quantize component (IQ) 402 de-quantizes the quantized transform coefficients of the CUs. The inverse transform component 404 transforms the frequency domain data from the inverse quantize component 402 back to the residual CUs. That is, the inverse transform component 404 applies an inverse unit transform, i.e., the inverse of the unit transform used for encoding, to the de-quantized residual coefficients to produce reconstructed residual values of the CUs.

A residual CU supplies one input of the addition component 406. The other input of the addition component 406 comes from the mode switch 408. When an inter-prediction mode is signaled in the encoded video stream, the mode switch 408 selects predicted PUs from the motion compensation component 410 and when an intra-prediction mode is signaled, the mode switch selects predicted PUs from the intra-prediction component 414.

The motion compensation component 410 receives reference data from the storage component 412 and applies the motion compensation computed by the encoder and transmitted in the encoded video bit stream to the reference data to generate a predicted PU. That is, the motion compensation component 410 uses the motion vector(s), reference index (or indices), etc. from the entropy decoder 400 and the reference data to generate a predicted PU.

The intra-prediction component 414 receives reconstructed samples from previously reconstructed PUs of a current picture from the storage component 412 and performs the intra-prediction computed by the encoder as signaled by an intra-prediction mode transmitted in the encoded video bit stream using the reconstructed samples as needed to generate a predicted PU.

The addition component 406 generates a reconstructed CU by adding the predicted PUs selected by the mode switch 408 and the residual CU. The output of the addition component 406, i.e., the reconstructed CUs, is stored in the storage component 412 for use by the intra-prediction component 414.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 416, a sample adaptive offset filter (SAO) 418, and an adaptive loop filter (ALF) 420. In some embodiments, the ALF component 420 may not be present. The in-loop filters may be applied on an LCU-by-LCU basis and the final filtered reference picture data is provided to the storage component 412.

Figure 5:
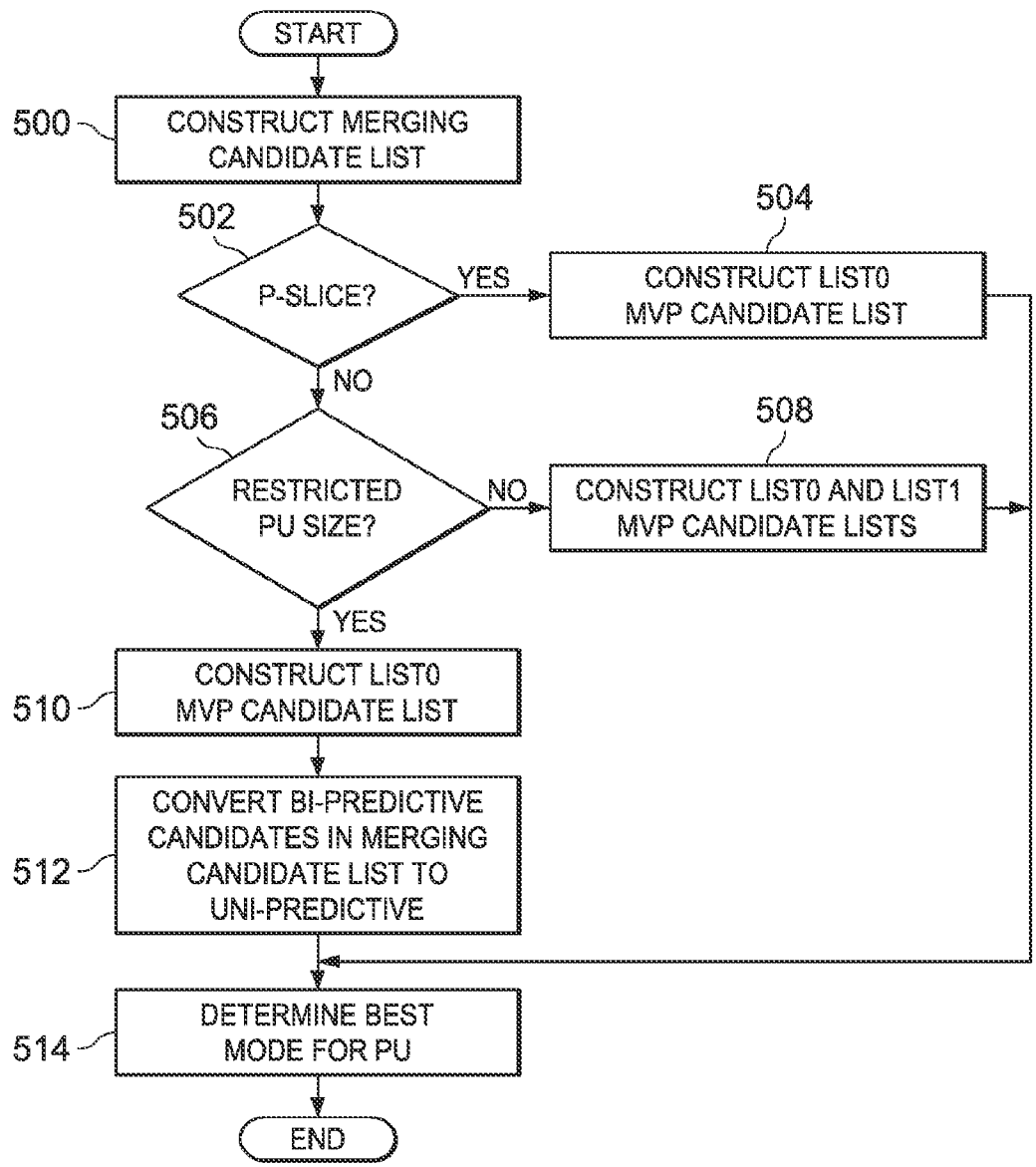
FIGS. 5 and 6 are flow diagrams of methods.

FIG. 5 is a flow diagram of a method for selecting a best inter-prediction mode for a PU that forces PUs of selected restricted sizes in B slices to be uni-predicted. The particular restricted PU sizes may be defined by the coding standard in use, e.g., HEVC. In some embodiments, the restricted PU sizes are PU sizes of 8×8 or smaller. In some embodiments, the restricted PU sizes are 4×8 and 8×4.

Figure 7:
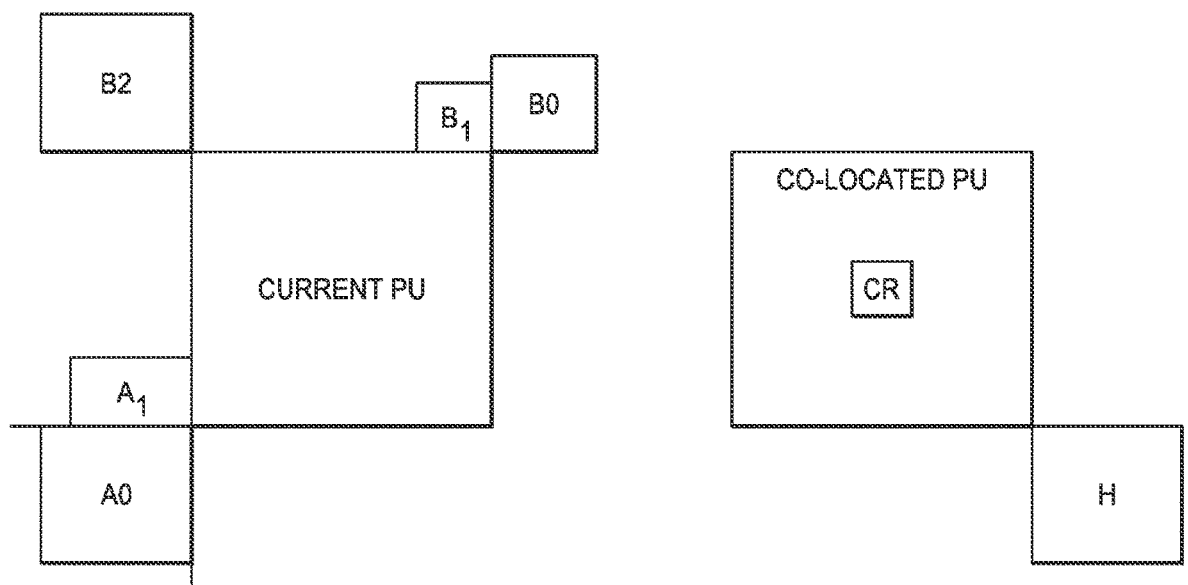
FIG. 7 is an example.

As previously mentioned, multiple inter-prediction modes are considered for a PU during motion estimation, i.e., skip mode (if a PU is also a CU), merge mode, and normal inter-prediction mode. Merge mode is designed to reduce coding overhead by allowing an inter-predicted PU to inherit motion data, i.e., motion vectors, prediction direction, and reference picture indices, from a position selected from neighboring motion data positions in the same picture and a temporal motion data position derived based on a co-located block of the same size as the PU in a reference picture, referred to as the co-located PU. FIG. 7 illustrates the particular motion data positions considered for a PU as defined in HEVC Draft 6 (and later drafts).

The skip mode is a special case of merge mode where the PU is also the coding unit (CU) and the CU has all zero transform coefficients. Regular (normal) motion vector coding for inter-prediction of a PU considers motion vectors of neighboring motion data positions in the same picture and a temporal motion data position derived based on a co-located PU for use as motion vector predictors for the PU. The same motion data positions considered for merge/skip mode are considered for normal inter-prediction mode.

In the method of FIG. 5, a merging candidate list is constructed 500 for the PU. The merging candidate list is formed by considering merging candidates from the seven motion data positions of FIG. 7. To derive motion data from a motion data position, the motion data is copied from the corresponding PU which contains (or covers) the motion data position. The specific derivation of a merging candidate list from these motion data positions is described in HEVC draft 6 (and later drafts). If the PU is in a forward predicted slice (P slice), the merging candidates in the merging candidate list are either from forward predicted PUs or are zero motion vector merging candidates configured for forward prediction. As is explained in HEVC Draft 6 (and later drafts), zero merging candidates are added to a merging candidate list when the merging candidate list derived from considering the candidate motion data positions contains fewer than a specified number of merging candidates.

If the PU is in a B slice, the merging candidates in the merging candidate list may be from forward predicted PUs, backward predicted PUs, bi-predicted PUs, or combined bi-predictive merging candidates, or may be zero motion vector merging candidates configured for bi-prediction. A combined bi-predictive merging candidate is generated by combining the merging candidates in the merging candidate list in a pre-defined combination priority order specified by HEVC. As with zero merging candidates, combined bi-predictive merging candidates may be added to a merging candidate list when the merging candidate list derived from considering the candidate motion data positions contains less than a specified number of merging candidates.

A merging candidate includes motion vector information, prediction flag information, and reference picture index information for a candidate motion data position. A merging candidate may include sufficient entries to accommodate a bi-directionally predicted PU, i.e., entries for a forward motion vector, a backward motion vector, a forward reference picture index, a backward reference picture index, and a prediction flag indicating prediction direction, i.e., forward, backward, or bi-directional. The prediction flag may be composed of two prediction list utilization flags used to indicate which of two reference picture lists, a forward reference picture list and a backward reference picture list, is to be used. The forward reference picture list may be referred to as list0 or l0 and the backward reference picture list may be referred to as list1 or l1. Each reference picture index is an index into a respective one of the reference picture lists. For a motion data position covered by a forward predicted PU, the merging candidate entries for the prediction flag, the forward motion vector, and the forward reference picture index will be valid and the remaining entries may have placeholder values. For a motion data position covered by a backward predicted PU, the merging candidate entries for the prediction flag, the backward motion vector, and the backward reference picture index will be valid and the remaining entries may have placeholder values. For a motion data position covered by a bi-directionally predicted PU, all merging candidate entries may be valid.

After construction 500 of the merging candidate list for the PU, if the PU is in a P slice (502—YES), a list0 motion vector predictor (MVP) candidate list is constructed 504 for the PU. A motion vector predictor candidate list is referred to as an advanced motion vector predictor (AMVP) candidate list in HEVC. The list0 MVP candidate list is formed by considering MVP candidates from the seven motion data positions of FIG. 7. The specific derivation of a list0 MVP candidate list from these motion data positions is described in HEVC draft 6 (and later drafts). In general, an MVP candidate for a motion data position is the motion vectors from the motion data of the corresponding PU which contains (covers) the motion data position. If the MVP candidate list resulting from considering the motion data positions contains less than a specified number of MVP candidates, one or more zero MVP candidates may be added to the list.

The merging candidate list and the list0 MVP candidate list are then used to determine 514 the best inter-prediction mode for the PU. This determination may be performed as follows. Coding costs are computed for each entry in the merging candidate list and, and the merging candidate with the best result selected. Coding costs are also computed for candidate motion vectors of normal inter-prediction mode with the best result selected. For coding cost computation of a forward-predicted candidate motion vector of normative inter-prediction mode, motion vector costs relative to each entry in the list0 MVP candidate list may be evaluated with the least motion vector cost added to the coding cost of the forward-predicted candidate. The coding costs of using the selected merging candidate and the best candidate motion vector of normal inter-prediction mode are compared to decide whether merge mode or normal inter-prediction mode is the best inter-prediction mode for the PU.

If the PU is not in a P-slice (502—NO), then it is in a B-slice. If the size of the PU is a restricted size (506—YES), then a list0 MVP candidate list 510 is constructed for the PU. In addition, bi-predictive merging candidates (if any) in the merging candidate list are converted 512 to uni-predictive merging candidates. As previously discussed, merging candidates for a PU in a B-slice may be forward, backward, or bi-predictive. Note that a full merging candidate list that may include bi-predictive merging candidates is constructed for the PU before any bi-predictive merging candidates are converted to uni-predictive.

In some embodiments, the bi-predictive merging candidates are converted to list0 (forward predicted) merging candidates. This conversion may be accomplished, for example, by invalidating the list1 motion data in a bi-predictive merging candidate and setting the prediction flag to indicate forward (list0) prediction. In some embodiments, the bi-predictive merging candidates are converted to list1 (backward predicted) merging candidates. This conversion may be accomplished, for example, by invalidating the list0 motion data in a bi-predictive merging candidate and setting the prediction flag to indicate backward (list1) prediction. In some embodiments, each bi-predictive merging candidate is converted to either a list0 or list1 merging candidate based on the values of the reference picture indices in the bi-predictive merging candidate. If the value of the forward (list0) reference picture index is less than or equal to the value of the backward (list1) reference picture index, the bi-predictive merging candidate is converted to a list0 merging candidate by invalidating the list1 motion data and setting the prediction flag to indicate forward (list0) prediction. Otherwise, the bi-predictive merging candidate is converted to a list1 merging candidate by invalidating the list0 motion data and setting the prediction flag to indicate backward (list1) prediction.

The modified merging candidate list and the list0 MVP candidate list are then used to determine 514 the best inter-prediction mode for the PU. This determination may be performed as previously described.

If the PU is in a B-slice (502—NO) and the size is not a restricted size (506—NO), then list0 and list1 MVP candidate lists are constructed for the PU 508. The list0 MVP candidate list and the list1 MVP candidate list are formed by considering MVP candidates from the seven motion data positions of FIG. 7. Note that the temporally co-located motion data positions for the list0 MVP candidate list derivation will be in a list0 (forward) reference picture and the temporally co-located motion data positions for the list1 MVP candidate list derivation will be in a list1 (backward) reference picture. The specific derivation of list0 and list1 MVP candidate lists from these motion data positions is described in HEVC draft 6 (and later drafts). In general, an MVP candidate for a motion data position is the motion vectors from the motion data of the corresponding PU which contains (covers) the motion data position. If the MVP candidate list resulting from considering the motion data positions contains less than a specified number of MVP candidates, one or more zero MVP candidates may be added to the list.

The merging candidate list and the list0 and list1 MVP candidate lists are then used to determine 514 the best inter-prediction mode for the PU. This determination may be performed as follows. Coding costs are computed for each entry in the merging candidate list and, and the merging candidate with the best result selected. Coding costs are also computed for candidate motion vectors of normal inter-prediction mode with the best result selected. For coding cost computation of a forward-predicted candidate motion vector of normal inter-prediction mode, motion vector costs relative to each entry in the list0 MVP candidate list may be evaluated with the least motion vector cost added to the coding cost of the forward-predicted candidate. For coding cost computation of a backward-predicted candidate motion vector of normal inter-prediction mode, motion vector costs relative to each entry in the list1 MVP candidate list may be evaluated with the least motion vector cost added to the coding cost of the backward-predicted candidate. For coding cost computation of a bi-predictive candidate motion vector of normal inter-prediction mode, motion vector costs relative to each entry in the list0 and list1 MVP candidate list may be evaluated with the least motion vector cost added to the coding cost of the bi-predictive candidate. The coding cost of using the selected merging candidate and the coding cost of the selected candidate motion vector of normal inter-prediction mode are compared to decide whether merge mode or normal inter-prediction mode is the best inter-prediction mode for the PU.

As previously mentioned, if merge mode or normal inter-prediction mode is selected for a PU, the selected mode is signaled in the compressed bit stream. The prediction direction for the PU may also be signaled when the PU is in a B-slice. In some embodiments, the binarization of the prediction direction syntax elements for PUs of the restricted size may be different from that for PUs that are not of the restricted size. For PUs that are not of the restricted size, the prediction direction may be binarized for CABAC encoding as shown in Table 1. For PUs of a restricted size, the prediction direction may be binarized for CABAC encoding as shown in Table 2 as bi-prediction for such PUs is not allowed.

TABLE 1

| Prediction direction | CABAC binarization code word |
|---|---|
| List 0 plus list 1 bi-prediction | 1 |
| List 1 uni-prediction | 01 |
| List 0 uni-prediction | 00 |

TABLE 2

| Prediction direction | CABAC binarization code word |
|---|---|
| List 1 uni-prediction | 1 |
| List 0 uni-prediction | 0 |

Figure 6:
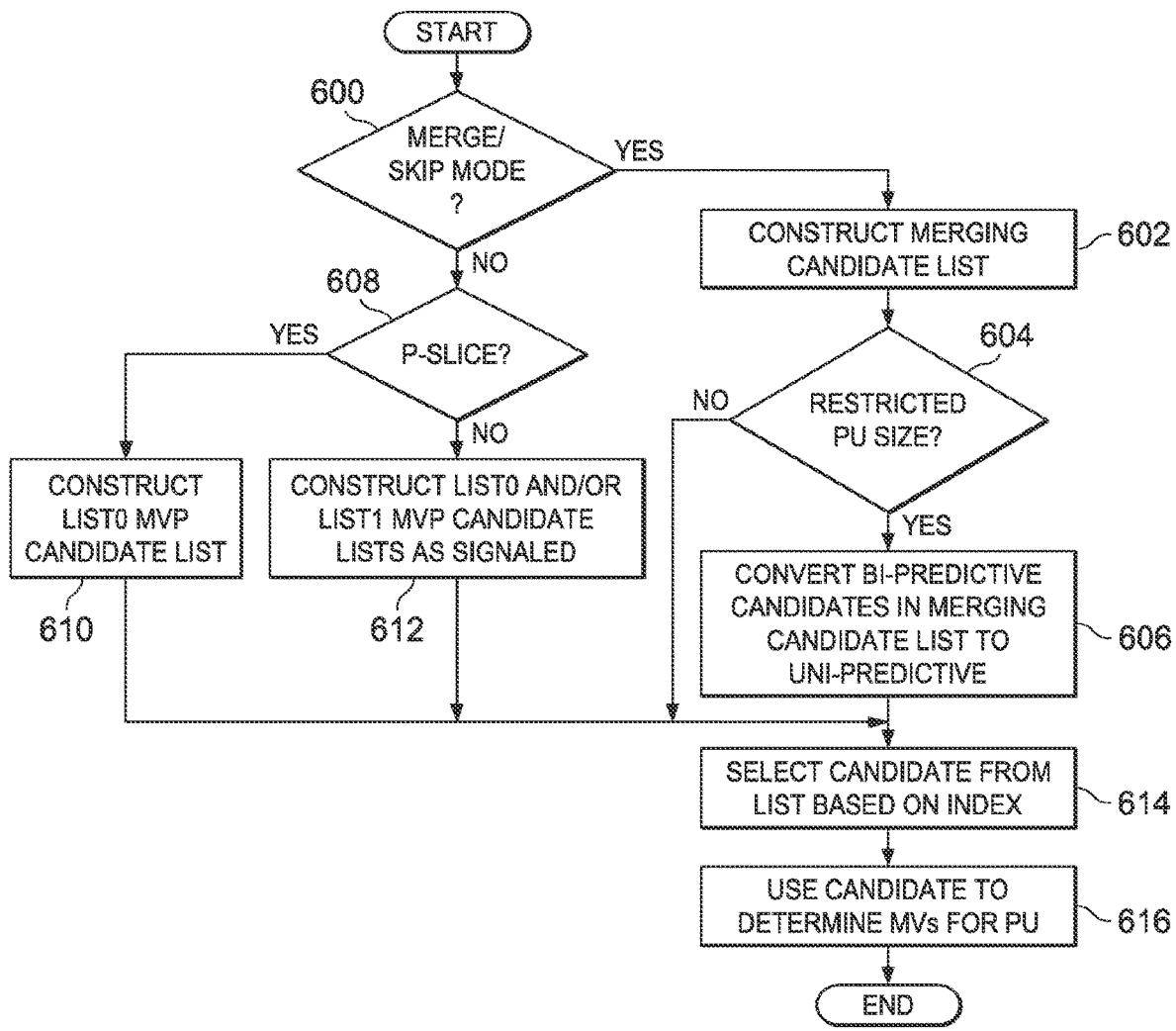

FIG. 6 is a flow diagram of a method for decoding an inter-predicted PU when PUs of selected restricted sizes in B-slices are forced to be uni-predicted by the encoder as in the method of FIG. 5. If an inter-predicted PU to be decoded is predicted in merge or skip mode (600—YES), a merging candidate list is constructed 602 for the PU. Construction of a merging candidate list in a decoder is the same as that in an encoder and is previously described herein.

If the size of the PU is a restricted size (604—YES), bi-predictive merging candidates in the merging candidate list (if any) are converted 606 to uni-predictive merging candidates. Otherwise (604—NO), the merging candidate list is not changed. Note that a full merging candidate list that may include bi-predictive merging candidates if the PU is in a B-slice is constructed for the PU before any bi-predictive merging candidates are converted to uni-predictive.

A merging candidate is selected 614 from the merging candidate list based on the index signaled in the compressed bit stream, and the selected merging candidate is used to determine 616 motion vectors and other motion data for the PU. In this instance, the motion vectors of the merging candidate are used as the motion vectors for the PU. In addition, the other motion data of the merging candidate (prediction direction and reference picture index (or indices)) is used for the PU.

The conversion of a bi-predictive merging candidate to a uni-predictive merging candidate in a decoder is the same as that used in the encoder. In some embodiments, the bi-predictive merging candidates are converted to list0 (forward predicted) merging candidates. This conversion may be accomplished, for example, by invalidating the list1 motion data in a bi-predictive merging candidate and setting the prediction flag to indicate forward (list0) prediction. In some embodiments, the bi-predictive merging candidates are converted to list1 (backward predicted) merging candidates. This conversion may be accomplished, for example, by invalidating the list0 motion data in a bi-predictive merging candidate and setting the prediction flag to indicate backward (list1) prediction. In some embodiments, each bi-predictive merging candidate is converted to either a list0 or list1 merging candidate based on the values of the reference picture indices in the bi-predictive merging candidate. If the value of the forward (list0) reference picture index is less than or equal to the value of the backward (list1) reference picture index, the bi-predictive merging candidate is converted to a list0 merging candidate by invalidating the list1 motion data and setting the prediction flag to indicate forward (list0) prediction. Otherwise, the bi-predictive merging candidate is converted to a list1 merging candidate by invalidating the list0 motion data and setting the prediction flag to indicate backward (list1) prediction.

If an inter-predicted PU to be decoded is not predicted in merge or skip mode (600—NO), then if the PU is in a P-slice (608—YES), a list0 MVP candidate list is constructed for the PU 610. Construction of a list0 MVP candidate list in a decoder is the same as that in an encoder and is previously described herein. An MVP candidate is selected 614 from the list0 MVP candidate list based on the index signaled in the compressed bit stream, and the selected MVP candidate is used to determine 616 motion vectors for the PU. In this instance, the motion vector of the MVP candidate is added to the motion vector differences signaled in the compressed bit stream to reconstruct the motion vector for the PU. The additional motion data (prediction direction and reference picture index) for the PU is decoded from the compressed bit stream.

If an inter-predicted PU to be decoded is not predicted in merge or skip mode (600—NO), and is not in a P-slice (608—NO), the PU is in a B-slice. A list0 MVP candidate list and/or a list1 MVP candidate list are constructed for the PU depending on the particular prediction direction signaled for the PU 612. Construction of a list0 or list1 MVP candidate list in a decoder is the same as that in an encoder and is previously described herein. If the current PU is a forward-predicted PU, a list0 MVP candidate list is constructed and an MVP candidate is selected 614 from the list0 MVP candidate list based on the index for the list signaled in the compressed bit stream. The selected MVP candidate is used to determine 616 the motion vector for the PU. If the current PU is a backward-predicted PU, a list1 MVP candidate list is constructed and an MVP candidate is selected 614 from the list1 MVP candidate list based on the index for the list signaled in the compressed bit stream. The selected MVP candidate is used to determine 616 the motion vector for the PU.

If the current PU is a bi-predictive PU, a list0 MVP candidate list and a list1 MVP candidate list are constructed. An MVP candidate is selected 614 from the list0 MVP candidate list based on the index for the list signaled in the compressed bit stream. The selected MVP candidate is used to determine 616 the list0 motion vector for the PU. Furthermore, an MVP candidate is selected 614 from the list1 MVP candidate list based on the index for the list signaled in the compressed bit stream. The selected MVP candidate is used to determine 616 the list1 motion vector for the PU. The additional motion data (prediction direction and reference picture index (or indices)) for the PU is decoded from the compressed bit stream.

Figure 8:
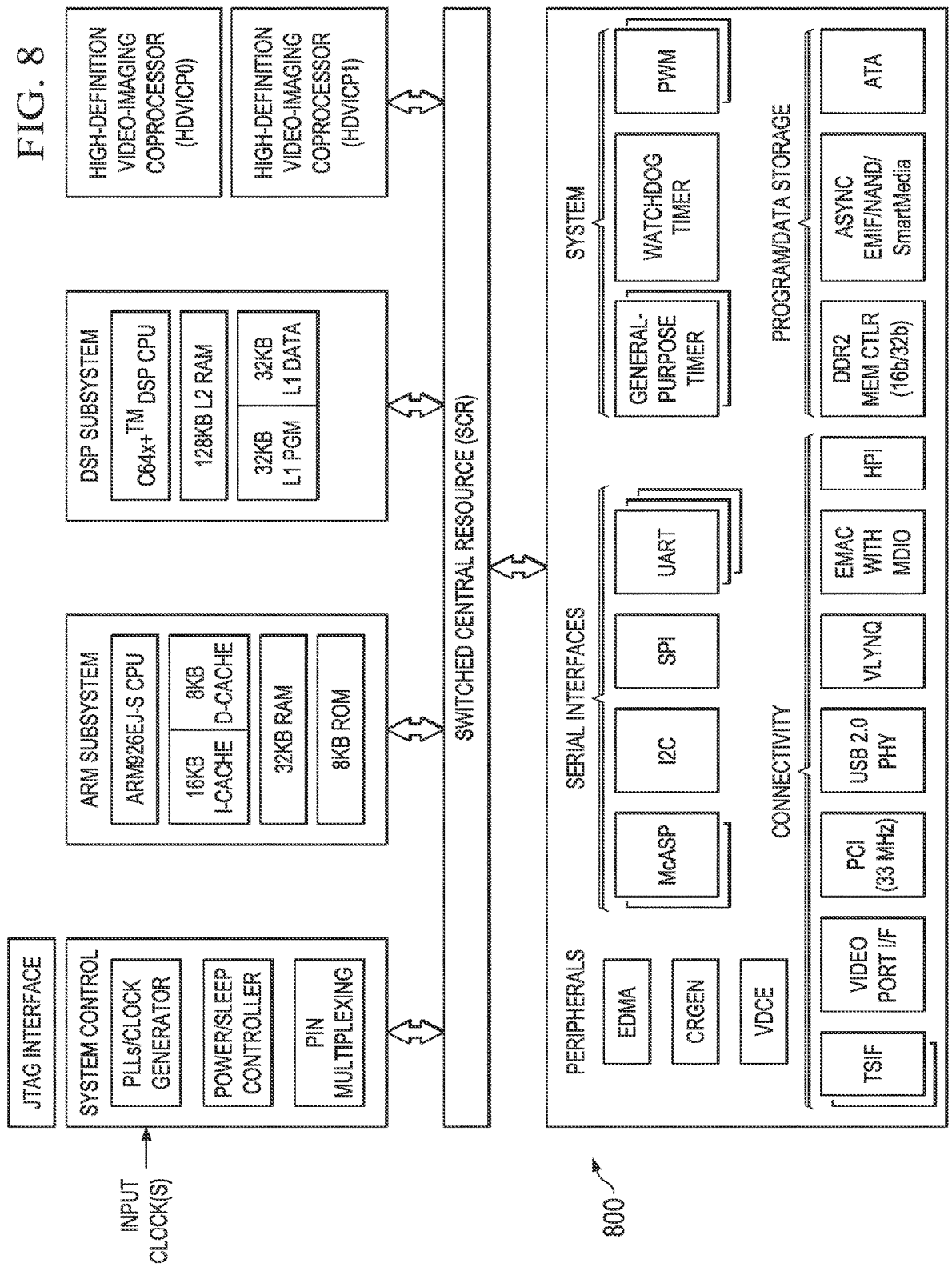
FIG. 8 is a block diagram of an illustrative digital system.

Embodiments of the methods, encoders, and decoders described herein may be implemented for virtually any type of digital system (e.g., a desk top computer, a laptop computer, a tablet computing device, a netbook computer, a handheld device such as a mobile (i.e., cellular) phone, a personal digital assistant, a digital camera, etc.). FIG. 8 is a block diagram of an example digital system suitable for use as an embedded system that may be configured to an embodiment of the method of FIG. 5 during encoding of a video stream and/or an embodiment of the method of FIG. 6 during decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 800 is a programmable platform designed to meet the processing needs of applications such as video encode/decode/transcode/transrate, video surveillance, video conferencing, set-top box, medical imaging, media server, gaming, digital signage, etc. The SoC 800 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 800 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 800, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 800 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 8, the SoC 800 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, quantization, and in-loop filtering. Further, the distinct circuitry in the HDVICP coprocessors that may be used for specific computation operations is designed to operate in a pipeline fashion under the control of the ARM subsystem and/or the DSP subsystem.

As was previously mentioned, the SoC 800 may be configured to perform an embodiment of the method of FIG. 5 during encoding of a video stream and/or an embodiment of the method of FIG. 6 during decoding of an encoded video bit stream. For example, the coding control of the video encoder of FIG. 3 may be executed on the DSP subsystem or the ARM subsystem and at least some of the computational operations of the block processing, including the intra-prediction and inter-prediction mode selection in which an embodiment of the method of FIG. 5 is used, transformation, quantization, and entropy encoding may be executed on the HDVICP coprocessors. Similarly, at least some of the computational operations of the various components of the video decoder of FIG. 4, including entropy decoding in which an embodiment of the method of FIG. 6 is used, inverse quantization, inverse transformation, intra-prediction, and motion compensation may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments of the inventions are described herein assuming the motion data positions of FIG. 7 are used for derivation of a merging candidate list, a list0 MVP list, and a list1 MVP lists, and the derivation (construction) of each list is performed as described in HEVC Draft 6. One of ordinary skill in the art will understand embodiments in which the motion data positions may be different and/or the list derivations may be different.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

The invention claimed is:
1. A system comprising:
a decoder circuit configured to:

decode a first syntax element in a bit stream, wherein the first syntax element specifies a prediction direction for a first prediction unit in an image;

decode a second syntax element in the bit stream, wherein the second syntax element specifies a prediction direction for a second prediction unit in the image;

determine that a size of the first prediction unit is a restricted size;

determine that a size of the second prediction unit is not the restricted size, wherein the size of the second prediction unit is 8×8;

select a first binarization for the first syntax element using the size of the first prediction unit;

select a second binarization for the second syntax element using the size of the second prediction unit, wherein the first binarization is different from the second binarization, wherein a value of 00 for the second syntax element represents list 0 uni-prediction, wherein a value of 01 for the second syntax element represents list 1 uni-prediction, and wherein a value of 1 for the second syntax element represents bi-prediction;

determine a value for the first syntax element using the first binarization; and determine a value for the second syntax element using the second binarization; and a display coupled to the decoder circuit and configured to display the image.

2. The system of claim 1, wherein the decoder circuit is configured to construct a candidate list for the second prediction unit to include a bi-predictive candidate.

3. The system of claim 1, wherein the display includes a light emitting diode display configured to display the image.

4. The system of claim 1, wherein the display includes a liquid crystal display configured to display the image.

5. The system of claim 1, wherein the decoder circuit is configured to:

construct a candidate list for the first prediction unit;

select a uni-predictive candidate from the candidate list; and determine motion vectors for the first prediction unit based on the selected uni-predictive candidate.

6. The system of claim 1, wherein the first prediction unit and the second prediction unit are part of a bi-predictive slice in the image.

7. The system of claim 1, wherein the decoder circuit is configured to:

construct a candidate list for the first prediction unit; and convert a bi-predictive candidate in the candidate list to a uni-predictive candidate by at least invalidating list motion data in the bi-predictive candidate in response to determining that the size of the first prediction unit is the restricted size.

8. The system of claim 7, wherein the decoder circuit is configured to:

compare a backward reference picture index for the bi-predictive candidate to a forward reference picture index for the bi-predictive candidate; and convert the bi-predictive candidate to the uni-predictive candidate based on the comparing of the backward reference picture index to the forward reference picture index.

9. The system of claim 1, wherein to determine that the size of the first prediction unit is the restricted size, the decoder circuit is configured to determine that the first prediction unit is a 4×8 block or an 8×4 block.

10. The system of claim 1, wherein a value of 0 for the first syntax element represents list 0 uni-prediction, and wherein a value of 1 for the first syntax element represents list 1 uni-prediction.

11. A method comprising:

decoding a first syntax element in a bit stream, wherein the first syntax element specifies a prediction direction for a first prediction unit in an image;

decoding a second syntax element in the bit stream, wherein the second syntax element specifies a prediction direction for a second prediction unit in the image;

determining that a size of the first prediction unit is a restricted size;

determining that a size of the second prediction unit is not the restricted size, wherein the size of the second prediction unit is 8×8;

selecting a first binarization for the first syntax element using the size of the first prediction unit;

select a second binarization for the second syntax element using the size of the second prediction unit;

determining a value for the first syntax element using the first binarization; and determining a value for the second syntax element using the second binarization, wherein the first binarization is different from the second binarization, wherein a value of 00 for the second syntax element represents list 0 uni-prediction, wherein a value of 01 for the second syntax element represents list 1 uni-prediction, and wherein a value of 1 for the second syntax element represents bi-prediction.

12. The method of claim 11, further comprising constructing a candidate list for the second prediction unit to include a bi-predictive candidate.

13. The method of claim 11, further comprising:

displaying the image via a light emitting diode display.

14. The method of claim 11, further comprising:

displaying the image via a liquid crystal display.

15. The method of claim 11, further comprising:

constructing a candidate list for the first prediction unit;

selecting a uni-predictive candidate from the candidate list; and determining motion vectors for the first prediction unit based on the selected uni-predictive candidate.

16. The method of claim 11, wherein the first prediction unit and the second prediction unit are part of a bi-predictive slice in the image.

17. The method of claim 11, further comprising:

constructing a candidate list for the first prediction unit; and converting a bi-predictive candidate in the candidate list to a uni-predictive candidate by at least invalidating list motion data in the bi-predictive candidate in response to determining that the size of the first prediction unit is the restricted size.

18. The method of claim 17, further comprising comparing a backward reference picture index for the bi-predictive candidate to a forward reference picture index for the bi-predictive candidate, wherein converting the bi-predictive candidate to the uni-predictive candidate is based on the comparing of the backward reference picture index to the forward reference picture index.

19. The method of claim 11, wherein determining that the size of the first prediction unit is the restricted size comprises determining that the first prediction unit is a 4×8 block or an 8×4 block.

20. A system comprising:
a camera configured to generate a video sequence; and
an encoder circuit coupled to the camera and configured to:
- determine that a size of a first prediction unit in the video sequence is a restricted size;
- determine that a size of a second prediction unit in the video sequence is not the restricted size, wherein the size of the second prediction unit is 8×8;
- select a first binarization for a first syntax element using the size of the first prediction unit;
- select a second binarization for a second syntax element using the size of the second prediction unit;
- encode the first syntax element using the first binarization; and
- encode the second syntax element using the second binarization,
wherein the first syntax element specifies a prediction direction for the first prediction unit,
wherein the second syntax element specifies a prediction direction for the second prediction unit,
wherein the first binarization is different from the second binarization,
wherein a value of 00 for the second syntax element represents list 0 uni-prediction,
wherein a value of 01 for the second syntax element represents list 1 uni-prediction, and
wherein a value of 1 for the second syntax element represents bi-prediction.

* * * * *